United States Patent
Huffman (12) 
(10) Patent No.: US 6,684,294 B1
(45) Date of Patent: Jan. 27, 2004

(54) USING AN ACCESS LOG FOR DISK DRIVE TRANSACTIONS

(75) Inventor: Amber D. Huffman, Banks, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/540,373

(22) Filed: Mar. 31, 2000

(51) Int. Cl.⁷ .............................................. G06F 12/00
(52) U.S. Cl. .................. 711/112; 711/113; 711/137; 711/204; 711/213
(58) Field of Search .................. 711/213, 204, 711/137, 112, 113

(56) References Cited

U.S. PATENT DOCUMENTS

| | | | | |
|---|---|---|---|---|
| 5,146,578 A | * | 9/1992 | Zangenehpour | 395/425 |
| 5,257,370 A | * | 10/1993 | Letwin | 395/650 |
| 5,410,653 A | * | 4/1995 | Macon, Jr. et al. | 395/250 |
| 5,546,536 A | * | 8/1996 | Davis et al. | 714/20 |
| 5,600,817 A | * | 2/1997 | Macon, Jr. et al. | 395/464 |
| 5,659,713 A | * | 8/1997 | Goodwin et al. | 395/484 |
| 6,021,408 A | * | 2/2000 | Ledain et al. | 707/8 |
| 6,163,773 A | * | 12/2000 | Kishi | 706/16 |
| 6,253,296 B1 | * | 6/2001 | Grimsrud et al. | 711/165 |
| 6,308,283 B1 | * | 10/2001 | Galipeau et al. | 714/6 |

FOREIGN PATENT DOCUMENTS

| | | | | |
|---|---|---|---|---|
| EP | 0 415 352 A2 | * | 3/1991 | G06F/12/08 |
| WO | WO 95/01600 | * | 1/1995 | G06F/12/00 |
| WO | WO 00/48068 | | 8/2000 | G06F/3/06 |

* cited by examiner

*Primary Examiner*—Matthew Kim
*Assistant Examiner*—Stephen Elmore
(74) *Attorney, Agent, or Firm*—Trop Pruner & Hu, P.C.

(57) ABSTRACT

A disk driver includes an access log for recording recent transactions with the hard disk drive. The access log may be consulted during write operations to buffer writes to memory before accessing the hard disk drive. The access log may also be consulted during read operations to prefetch additional data during access of the hard disk drive.

24 Claims, 6 Drawing Sheets

USING AN ACCESS LOG FOR DISK DRIVE TRANSACTIONS

BACKGROUND

This invention relates to disk drivers and, more particularly, to the use of a memory buffer during disk drive operations.

In a computer system, a device driver is a software program that controls a hardware device. A computer system with a keyboard, a mouse, and a hard disk drive, for example, may include a keyboard driver, a mouse driver, and a hard disk driver.

In a personal computer-based system, device drivers typically interface between other software programs and the device controlled by the device driver. An operating system usually includes a variety of device drivers, although new device drivers may be loaded into the computer system, such as when loading a new hardware device.

The operating system works in conjunction with the device driver for a specific device to service a request. For example, when a user directs the operating system to "load" or "execute" an application program, the application program is typically stored on the hard disk drive. The "loading" of the application program is essentially a request to read the application program from the hard disk drive and to write the program into a memory. The application program may then run from the memory.

The operating system thus sends the read request to a disk driver which services the hard disk drive. The disk driver translates the "load application program" command into a hard disk drive command, to retrieve the data from the location where the application is stored. For example, the disk driver may issue a "read sectors" command, identifying both where the application program is stored on the hard disk drive as well as to where in memory the application program is to be transferred. The disk driver thus acts as a translator between the requesting program and the hard disk drive. Write operations, which transfer from the memory to the hard disk drive, operate similarly.

Whether for read or write operations, disk drive accesses are typically substantially slower than memory accesses. Therefore, in addition to translating the particular software request, a disk driver may allocate a portion of memory, sometimes known as a cache or a buffer, to reduce the number of hard disk drive accesses and thus improve system performance.

For example, when a read request for a particular sector or group of sectors is made, the disk driver may "prefetch" additional, unrequested sectors into the buffer portion of the memory. The prefetching anticipates that subsequent requests will be made for these as yet unrequested sectors.

For a write operation, buffer may be used to store write data. Again, to minimize the number of hard disk drive accesses, the disk driver may store data for a number of write operations in the memory buffer. Then, at a later time, the disk driver may perform a single write operation to the hard disk drive to fulfill all the write requests at once.

The disk driver, however, may not always predict which future hard disk drive requests may occur. In some cases, attempts to optimize performance may backfire. A number of prefetched sectors which are never retrieved from the memory actually may diminish performance. This is because it took time to retrieve the additional non-used sectors. Likewise, a buffered write which is not soon combined with another write merely delays the intended write to the hard disk drive, creating the risk that the data could be lost, such as if power is unintentionally removed from the computer system.

Thus, there is a continuing need for a disk driver which improves performance of either or both of the read prefetch and write buffer operations.

DETAILED DESCRIPTION

In accordance with several embodiments, an access log may assist a disk driver in reducing hard disk drive accesses, where possible, for improving the drive performance. The access log stores information about recent accesses to the hard disk drive. The driver may intelligently perform read prefetch and/or write buffer operations after consulting with the access log, such that unnecessary accesses to the hard disk drive may be avoided, yet hard disk drive operations are serviced as requested.

Figure 1:
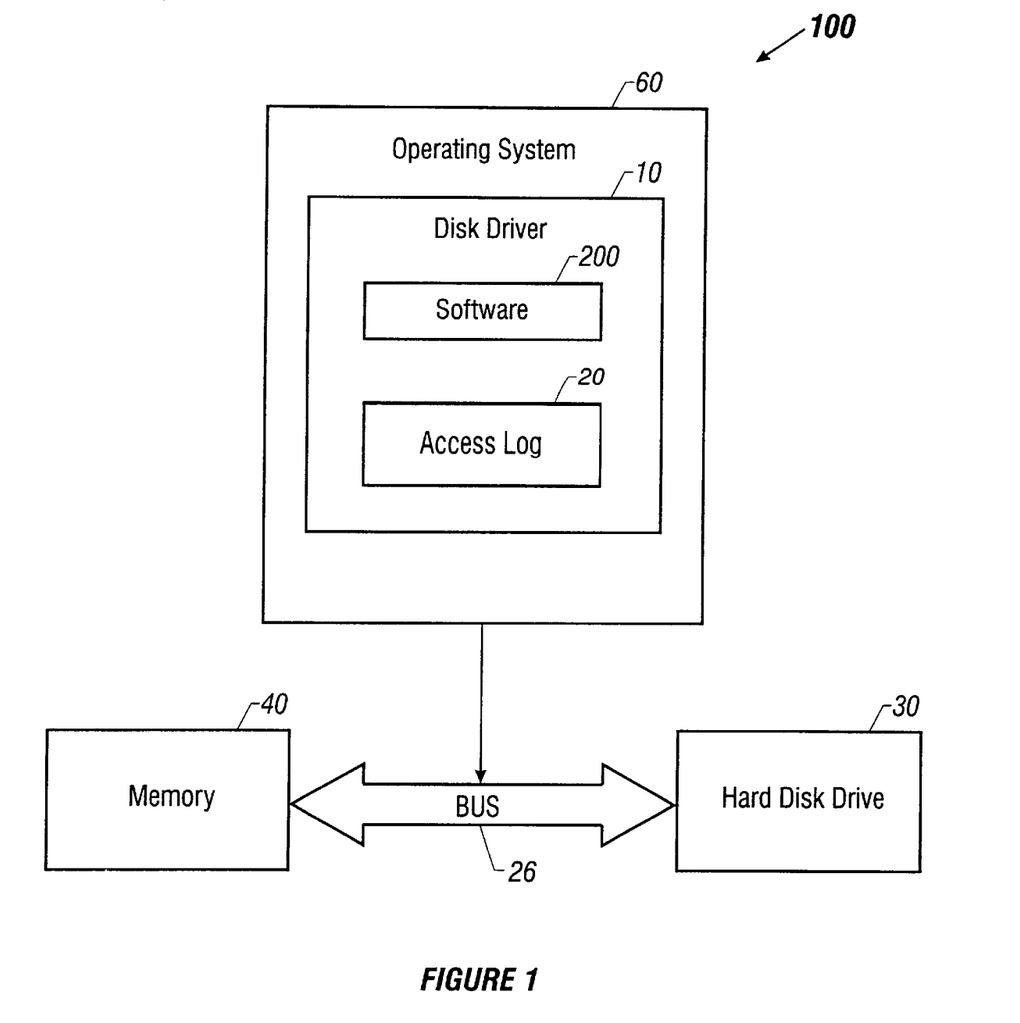
FIG. 1 is a block diagram of a system according to one embodiment.

In FIG. 1, according to one embodiment, a system 100 includes a disk driver 10 comprising an access log 20. The disk driver 10 is part of an operating system 60. As explained in the background, the disk driver 10 includes commands for communicating with the hard disk drive 30.

In one embodiment, the system 100 is a processor-based system 100, such as a personal computer system. Accordingly, the disk driver 10, the operating system 60, and other software are executed by a processor (not shown), such as an X86-based microprocessor, a microcontroller, or a Pentium® microprocessor, as just a--feW examples.

In one embodiment, the system 100 is a processor-based system 100, such as a personal computer system. Accordingly, the disk driver 10, the operating system 60, and other software are executed by a processor (not shown), such as an X86-based microprocessor, a microcontroller, or a Pentium® microprocessor, a product of Intel Corporation, Santa Clara, Calif. as just a few examples.

The hard disk drive 30 may be an integrated drive electronics (IDE) drive, an enhanced IDE (EIDE) drive, a small computer systems interface (SCSI) drive, an enhanced small device interface (ESDI) drive, a redundant array of independent disks (RAID) drive, to name a few examples. The hard disk drive 30 is coupled to the memory 40 by a bus 26.

The operating system 60 and the disk driver 10 work together to service requests to access the hard disk drive 30. For a disk read operation, the requested data is transferred from the hard disk drive 30 over the bus 26 to the memory 40. For a disk write operation, the intended data is transferred from the memory 40 over the bus 26 to the hard disk drive 30. Thus, the operating system 60 and the disk driver 10 may control transfers between the hard disk drive 30 and the memory 40.

The access log 20 may be used for both disk read and disk write operations by the disk driver 10 in some embodiments. In one embodiment, the access log 20 contains information about recent accesses to the hard disk drive 30. The disk driver 10 may use the "drive access history" of the access log 20 to assess whether an operation is a good candidate for write buffering or read prefetching operations.

For example, the access log 20 may contain an indication of the type of transaction; that is, whether a read or a write operation was performed to the hard disk drive 30. Further, the access log 20 may indicate which region or regions of the hard disk drive 30 were accessed. The access log 20 may also contain an indication of the time of the access.

In some embodiments, the access log 20 is time-limited such that a history of drive activity is available for a predetermined time period. In other embodiments, the access log 20 is size-limited such that only a predetermined number of transactions is maintained. Such an access log 20 may operate as a first-in-first-out (FIFO) memory, such that the oldest data is replaced with the newest data.

Figure 2A:
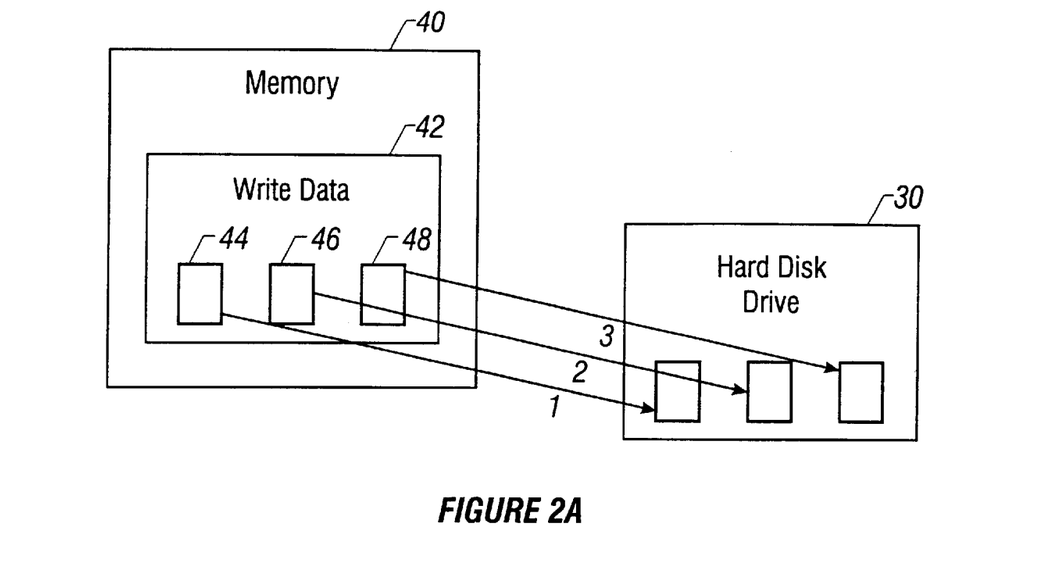
FIGS. 2A and 2B are diagrams illustrating write buffering according to one embodiment.

In FIG. 2A, the memory 40 may include an area designated as write data 42, such as for performing a disk write operation. The write data 42 includes blocks of data 44, 46, and 48. The blocks of data 44, 46, and 48 may represent sectors, where a sector is typically 512 bytes, groups of sectors, or some other atomic unit of data.

In FIG. 2A, to transfer the write data 42, three separate accesses of the hard disk drive 30 may be made. In one write operation, the block 44 may be transferred from the memory 40 to the hard disk drive 30. In a second write operation, the block 46 may be transferred from the memory 40 to the hard disk drive 30. In yet a third operation, the block 48 may be transferred from the memory 40 to the hard disk drive 30.

Figure 2B:
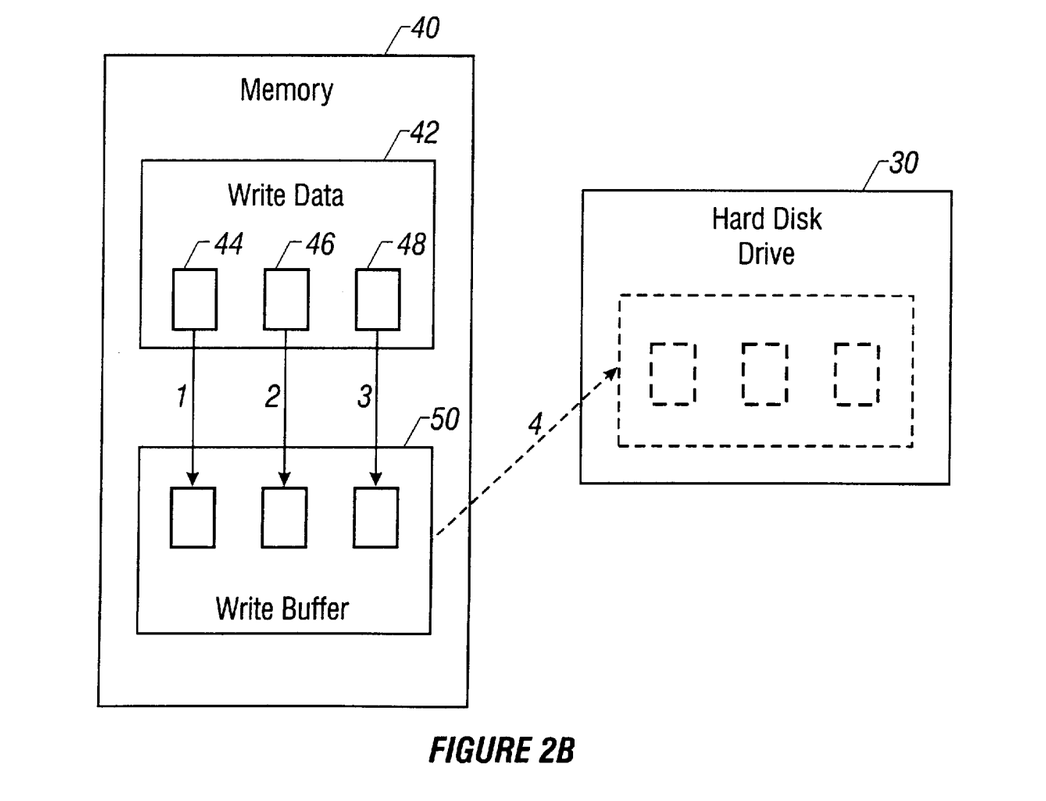

In FIG. 2B, the memory 40 includes a write buffer 50. In some embodiments, the write buffer 50 may act as a temporary storage location for data intended for the hard disk drive 30. By using the write buffer 50, the disk driver 10 may convert three accesses to the hard disk drive 30 into a single access.

In a first write operation, the block 44 is transferred from the memory 40 to the write buffer 50. As a memory-to-memory transfer, this operation is typically much faster than a memory-to-disk operation. In a second write operation, the block 46 is transferred to the write buffer 50 as a second memory-to-memory transfer. In a third operation, the block 48 is transferred to the write buffer 50, from the write data 42 part of the memory 40.

At some time later, the disk driver 10 may direct a fourth write operation, this time to be performed between the write buffer 50 and the hard disk drive 30. The transfer between the memory 40 and the hard disk drive 30 may include all three blocks stored in the write buffer 50 as a result of the three previous memory-to-memory transfers. The disk driver 10 may perform the fourth write operation because the write buffer 50 is full, a "save" operation has been initiated, or based upon other criteria.

Of course, the transfers illustrated in FIG. 2B are more efficient for certain blocks 44, 46, and 48. For example, where the blocks 44, 46, and 48 are stored contiguously on the hard disk drive 30, the three separate write operations described above may efficiently be accomplished using a single access to the hard disk drive 30.

According to one embodiment, the access log 20 assists the disk driver 10 in predicting the best candidates for write buffering. By scanning the access log 20 of recent write operations, the disk driver 10 may determine whether a single block of the hard disk drive 30 is repeatedly being written to. If found, in one embodiment, the disk driver 10 temporarily stores the block in the write buffer 50 instead of immediately storing the block on the hard disk drive 30.

In a second embodiment, the access log 20 may be scanned for blocks adjacent to a block being written which have already been recently written. The write buffering algorithm according to these embodiments is described further in conjunction with the description of FIG. 5, below.

The disk driver 10 may also use the memory 40 during read operations. As with write operations, read operations involve transfers between the memory 40 and the hard disk drive 30. This time, however, no data is waiting in memory 40 to be written to the hard disk drive 30. Instead, as in FIG. 3A, a read buffer 70 of the memory 40 may be a destination for read operations from the hard disk drive 30.

Figure 3A:
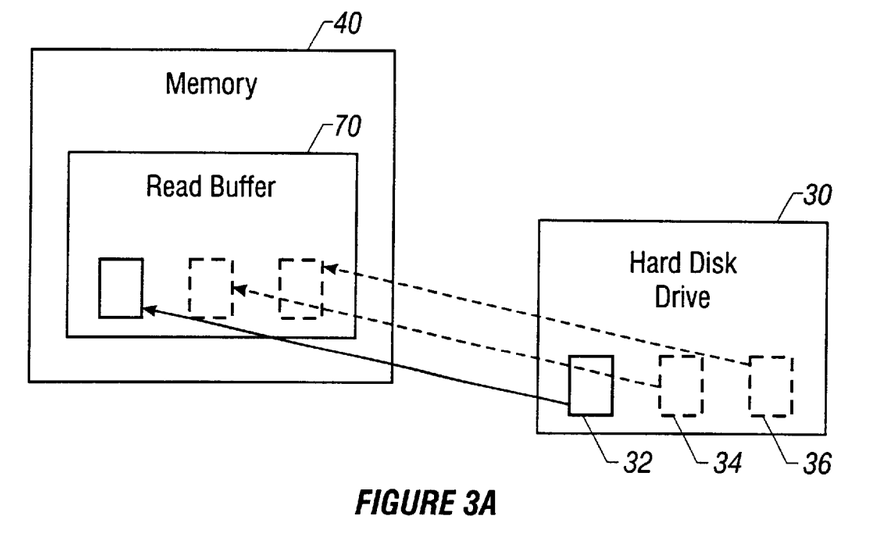
FIGS. 3A and 3B are diagrams illustrating read prefetching according to one embodiment.

Further, the read buffer 70 may be used to prefetch additional, unrequested blocks of data from the hard disk drive 30. In response to a single read request for a block 32 from the hard disk drive 30, the disk driver 10 may transfer the block 32 into the read buffer 70. Assume that the block 32 is adjacent to a block 34, which is also adjacent to a block 36 on the hard disk drive 30. During the same read operation that transferred the block 32 to the read buffer 70, the disk driver 10 may transfer blocks 34 and 36 from the hard disk drive 30 to the read buffer 70.

Thus, in addition to retrieving the requested block 32 of the hard disk drive 30, the disk driver 10 additionally prefetches other blocks to the read buffer 70. The additional prefetched blocks may, for example, be adjacent to the requested block on the hard disk drive 30.

Figure 3B:
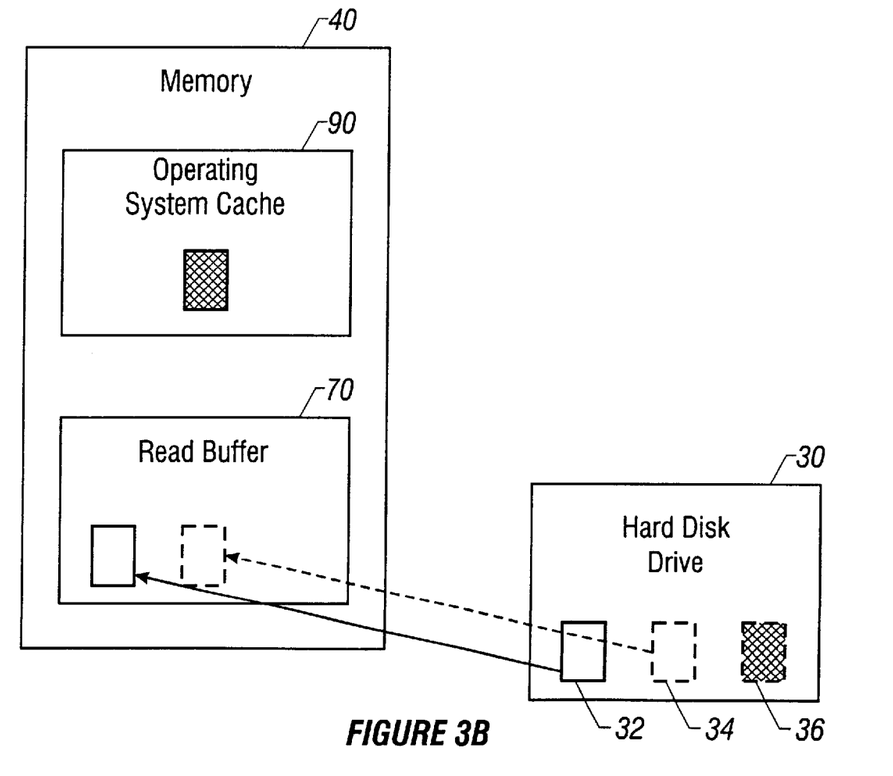

However, in FIG. 3B, the operating system 60 may include its own cache 90. Once data is retrieved from the hard disk drive 30 and transferred to the memory 40, the operating system may store the retrieved data in the operating system cache 90. In one embodiment, this additional "virtual" storage of disk drive information affects when the disk driver 10 performs prefetch operations in conjunction with disk read operations.

For example, suppose a prior read operation transferred the block 36, shown cross-hatched in FIG. 3B, from the hard disk drive 30 to the memory 40. Ostensibly to speed up subsequent operations involving the block 36, the operating system 60 stores the block 36 in the operating system cache 90 portion of the memory 40.

As in FIG. 3A, assume that the blocks 32, 34, and 36 are contiguously located on the hard disk drive 30. If a read operation requests block 32, the file system driver 10 may prefetch adjacent blocks, such as blocks 34 and 36, during the transfer of block 32 from the hard disk drive 30 to the read buffer 70. However, the block 36 is already stored in the operating system cache 90, from the prior operation. Thus, if stored in the read buffer 70, the block 36 is not likely to be accessed because the operating system cache 90 already has the block 36.

Thus, in one embodiment, the disk driver 10 consults the access log 20 to determine whether the requested read is a good candidate for prefetching additional data from the hard disk drive 30. For example, if a block is to be read, the disk driver 10 may want three contiguous blocks to be prefetched following the requested block. For each of the three blocks, the access log 20 is consulted to see whether it was recently accessed.

In FIG. 3B, according to one embodiment, the disk driver 10 consults the access log 20 for information about accesses to the block 34 as well as the block 36. Because the block 36 has recently been read, the disk driver 10 prefetches block 34 only, in addition to retrieving the requested block 32. Here, the disk driver 10 presumes that the block 36 is already available to the operating system 60, such as in its operating system cache 90. This ensures that blocks prefetched into the disk buffer 70 are more likely to be used. Further, the disk buffer 70 and the operating system cache 90 do not have duplicate information.

The size of the prefetch operation, e.g., the number of blocks transferred in response to a single read request, may be adjusted according to the size of the disk buffer 70, the size of the requested transfer, or according to other factors. Likewise, the size of the access log 20 may be varied according to characteristics of the disk drive operations, the capabilities of the system, and other factors.

Figure 4:
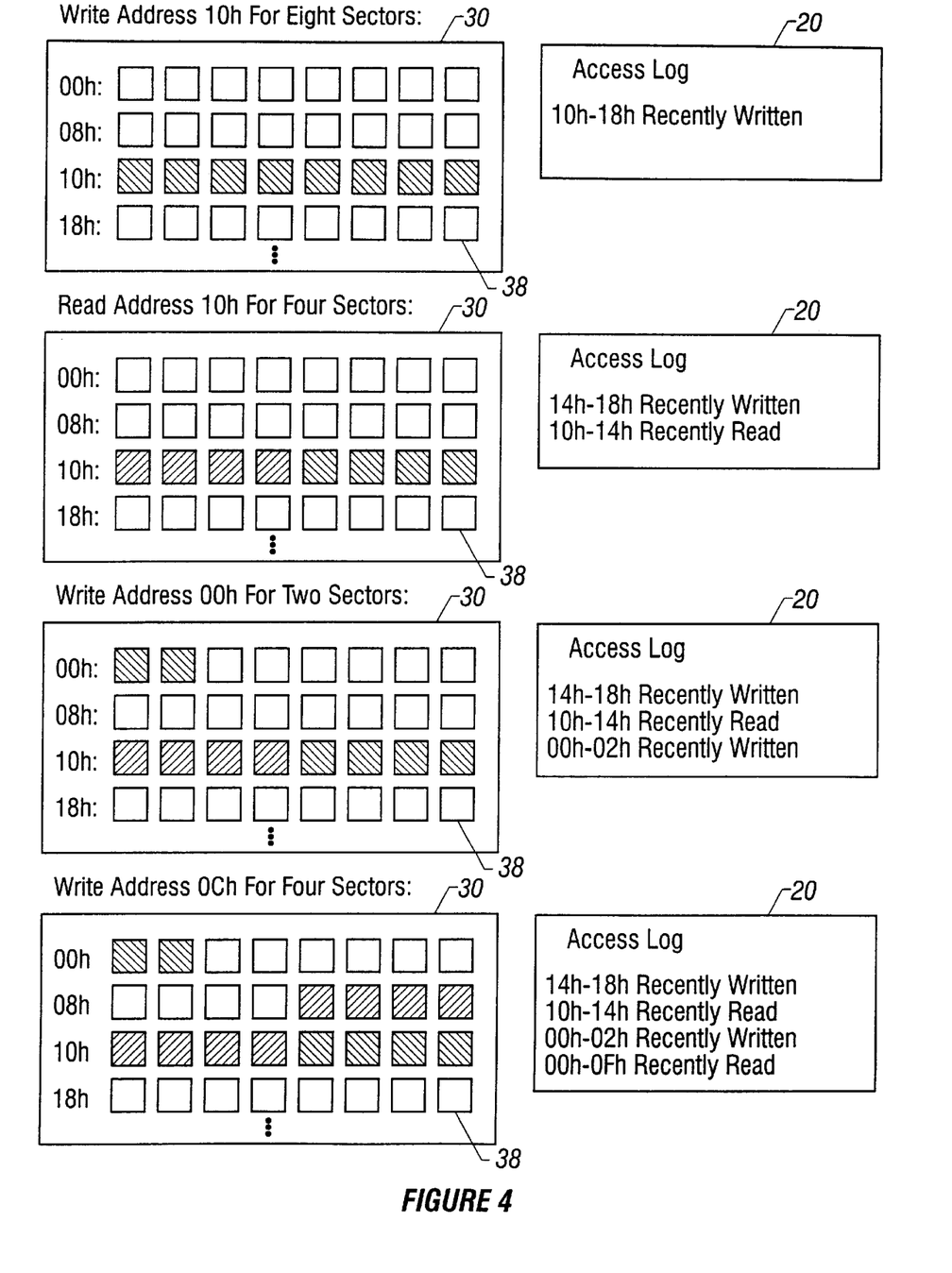
FIG. 4 is a diagram illustrating the access log according to one embodiment.

In FIG. 4, the access log 20 is updated for each access of the hard disk drive 30, according to one embodiment. A region of the hard disk drive 30 includes a plurality of sectors 38. Thus, in FIG. 4, thirty-two contiguous sectors of the hard disk drive 30 are used to illustrate how the access log 20 tracks operations.

The disk driver 10 may perform a series of read and/or write operations on the hard disk drive 30. In a hypothetical example shown in FIG. 4, according to one embodiment, the disk driver 10 first receives a "write address 10h for eight sectors" operation. As a result, the eight sectors 38 corresponding to that address are "write" striped. Further, the access log 20 is updated to reflect that address offsets 10h through 18h were recently written.

Next, the disk driver 10 receives a "read address 10h for four sectors" operation. Following this operation, the first four sectors 38 of address 10h are "read" striped to identify that a read operation was performed on the sectors 38.

Notice that the access log 20 shows these four sectors 38 as having been recently read only, even though the prior operation was a write operation to the same sectors 38. The four sectors, 14h through 18h, are still shown as having been recently written in the access log 20.

In a second embodiment, the access log 20 shows the two aforementioned operations as separate entries. In this way, both the write operation and the subsequent read operation, performed on the same sectors 34, is supplied by the access log 20. Other implementations of the access log 20 are possible for creating a historical record of accesses to the hard disk drive 30.

Next, a "write address 00h for two sectors" operation is initiated on the hard disk drive 30. Accordingly, the first two sectors 38 are "write" striped in FIG. 4. The access log 20 is updated with a third entry to reflect this operation.

For the fourth operation, a "read address OCh for four sectors" operation is performed on four new sectors. The requested sectors 38 of the hard disk drive 30 are "read" striped. Likewise, the access log 20 is updated to reflect that sectors OCH through OFH were recently read.

Figure 5:
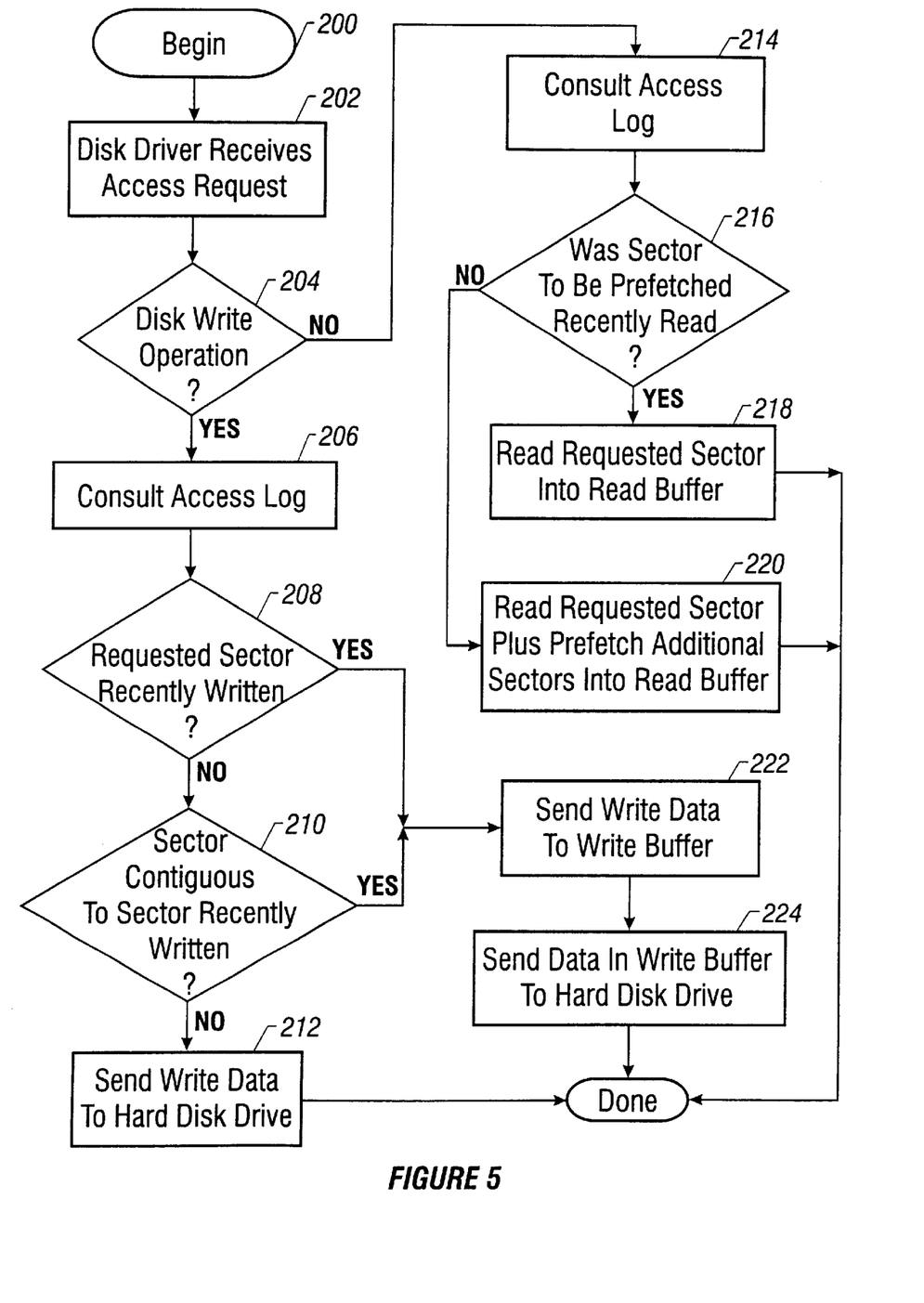
FIG. 5 is a flow diagram of the system in operation according to one embodiment.

In FIG. 5, according to one embodiment, the disk driver 10 may perform both read prefetch operations and write buffering operations by first receiving a request to access the hard disk drive 30 (block 202). The disk driver 10 determines whether the operation is a read or a write operation (diamond 204) before proceeding. As with FIG. 4, the access log 20 tracks accesses to sectors 38 of the hard disk drive 30.

For a write operation (see also FIG. 2), the disk driver 10 consults the access log 20 (block 206). The access log 20 may indicate to the disk driver 10 whether the requested sector 38 was recently written (diamond 208). If so, the requested access may be a good candidate for write buffering. Accordingly, the disk driver 10 sends the write data 42 to the write buffer 50 (block 222).

If the requested sector 38 has not been recently written to, the access log 20 further may be consulted to determine whether the requested sector 38 is contiguous to a sector recently written to (diamond 210). If so, the disk driver 10 sends the write data 42 to the write buffer 50 (block 222). At some later time, the data 42 in the write buffer 50 may be written to the hard disk drive 30 (block 224).

If, instead, the requested sector is not contiguous to a sector 38 recently written as recorded by the access log 20, in one embodiment, the requested write operation is not a good candidate for write buffering. Accordingly, the disk driver 10 sends the write data 42 to the hard disk drive 30 (block 212). The write operation is thus complete.

Where, instead, a read operation is requested (see also FIG. 3), the disk driver 10 also consults the access log 20, this time for determining whether the environment may be amenable for prefetching additional, unrequested sectors (block 214). In one embodiment, the disk driver 10 may prefetch sectors adjacent to the requested sector. Thus, in consulting the access log 20, for each prospective sector to be prefetched, the disk driver 10 determines whether the prospective sector was recently read (diamond 216). If so, the prospective sector may already be stored in the operating system cache 90.

Accordingly, in one embodiment, a prefetch operation is not indicated. Thus, the disk driver 10 reads the requested sector 38 into the disk buffer 70, where it may be retrieved by the requesting program, such as the operating system 60 (block 218). The operating system 60 may, for example, transfer the requested sector 38 from the read buffer 70 to the operating system cache 90, both located in the system memory 40.

If, however, the access log 20 indicates that the sector or sectors to be prefetched were not recently read (diamond 216), the disk driver 10 reads the requested sector 38, plus prefetches additional sectors into the read buffer 70 (block 220). As when no prefetching occurs, the operating system 60 may retrieve the data from the read buffer 70 and transfer the data to the operating system cache 90.

Subsequent requests by the operating system 60 to prefetched data in the read buffer 70 may be serviced by the disk driver 10 without access to the hard disk drive 30. Following the write to the read buffer 70, whether additional sectors are prefetched or not, the read operation is thus complete.

Figure 6:
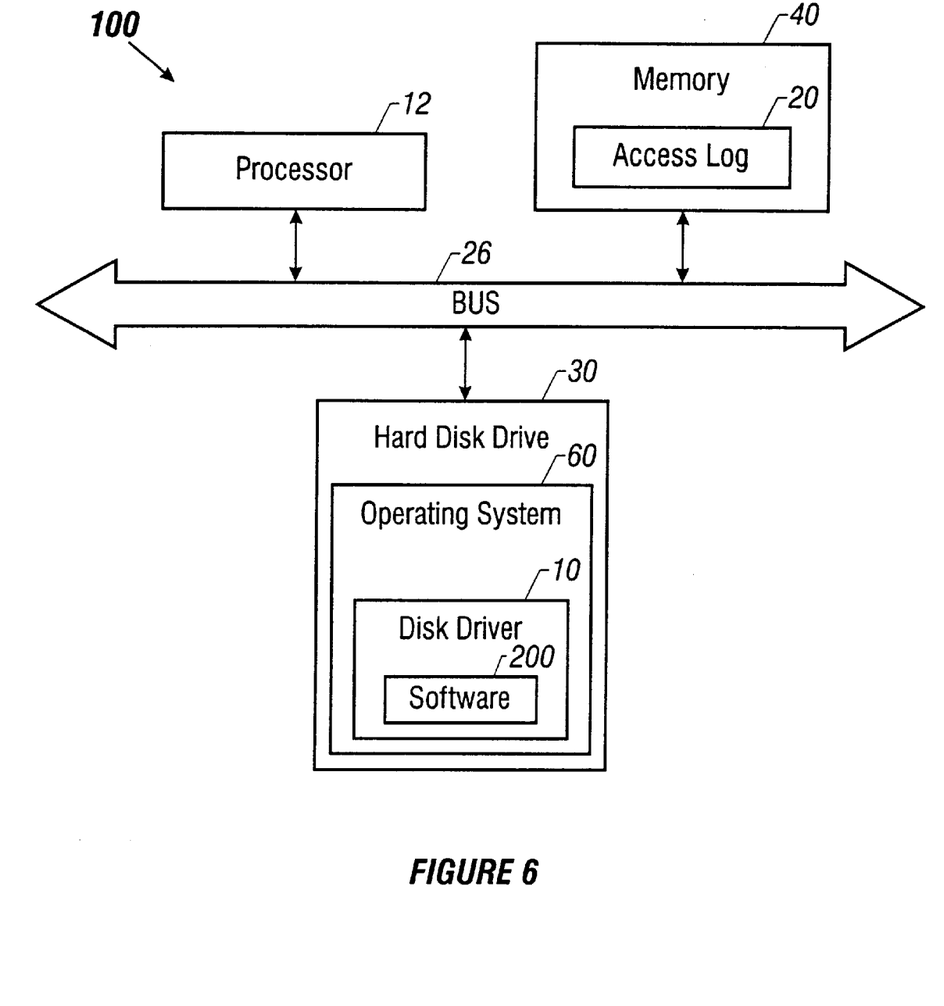
FIG. 6 is a block diagram of the system according to one embodiment.

In FIG. 6, according to one embodiment, the system 100 includes a processor 12 on the bus 26. The operating system 60 and the disk driver 10, including the software 200 of FIG. 5, are stored on the hard disk drive 30, a non-volatile storage medium. In one embodiment, the operating system 60 and the disk driver 20 are loaded into the memory 40 during power-on, for faster runtime execution.

In one embodiment, the access log 20 is created by the disk driver 10 by allocating a portion of the memory 40. Once accesses to the hard disk drive 30 commence, the disk driver 10 writes to access log 20 with the type of operation and the affected region of the hard disk drive 30.

Thus, in some embodiments, a disk driver uses an access log to prefetch additional data during read operations and buffer data during write operations such that access to the hard disk drive is reduced. The access log supplies the disk driver with a history of hard disk drive accesses. From the history, the disk driver may predict future accesses to the hard disk drive, and, from these predictions, may use system memory to possibly reduce the number of accesses to the hard disk drive.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method, comprising:
    receiving a request to read a region of a disk drive;
    identifying an additional region of the disk drive;
    retrieving an access log containing time-limited history of previously read regions of the disk drive;
    consulting the access log to determine whether the additional region of the disk drive has been recently read; and
    prefetching the additional region of the disk drive to a memory based at least in part upon the access log.

2. The method of claim 1, retrieving an access log of previously read regions of the disk drive further comprising:
    scanning an entry of the access log comprising a plurality of entries;
    finding a previously read region entry in the access log; and
    comparing the additional region to the previously read region entry.

3. The method of claim 2, comparing the additional region to the previously read region entry further comprising determining whether the additional region and the previously read region are not identical.

4. A method, comprising:
    receiving a request to write to a region of a disk drive;
    retrieving an access log of previously written regions of the disk drive;
    consulting the access log to determine whether the previously written regions of the disk drive has been recently written; and
    writing to a memory based upon the access log.

5. The method of claim 4, retrieving an access log of the previously written regions of the disk drive further comprising:
    scanning an entry of the access log comprising a plurality of entries;
    finding a previously written region entry in the access log; and
    comparing a requested region to the previously written region entry.

6. The method of claim 5, comparing the requested region to the previously written region entry further comprising determining whether the requested region is contiguous to the previously written region on the disk drive.

7. The method of claim 5, comparing the requested region to the previously written region entry further comprising determining whether the requested region and the previously written region are identical.

8. A method, comprising:
    receiving a first request to access a region of a disk drive;
    storing a record of the first request in a memory including information indicating whether the access request was a read or a write operation;
    servicing the first request;
    receiving a second request to access a region of the disk drive;
    replacing the record of the first request with a second record of the second request; and
    servicing the second request.

9. The method of claim 8, further comprising:
    receiving a second request to access a region of the disk drive;
    storing a second record of the second request after the first record of the first request; and
    servicing the second request.

10. The method of claim 8, storing a record of the first request in a memory further comprising indicating the region to be accessed.

11. The method of claim 8, storing a record of the first request in a memory further comprising indicating a time of the request.

12. A system, comprising:
    a processor;
    a memory coupled to the processor;
    a hard disk drive coupled to the processor; and
    a disk driver coupled between the hard disk drive and the memory comprising an access log, wherein the disk driver:
        receives a request to read a first region of the hard disk drive;
        identifies a second region of the hard disk drive;
        consults the access log to determine whether the second region has been recently read; and
        retrieves to the memory both the first region and the second region of the hard disk drive if the second region has not recently been read.

13. The system of claim 12, wherein the disk driver further:
    receives a request to write to a third region of the hard disk drive;
    consults the access log to determine the regions that have recently been written; and
    writes to the third region if the third region has not recently been written.

14. The system of claim 13, wherein the disk driver writes to the memory if the third region has recently been written.

15. The system of claim 13, wherein the disk driver further:
    receives a request to write to a fourth region of the hard disk drive;
    consults the access log to determine the regions that have recently been written; and
    writes to the memory if the fourth region is adjacent to a region that has recently been written.

16. The system of claim 12, wherein the disk driver further:
    writes to the access log each time a region of the hard disk drive is accessed.

17. An article comprising a medium storing instructions that causes a processor-based system to:
    receive a request to read a region of a disk drive;
    identify an additional region of the disk drive;
    retrieve an access log containing time-limited history of previously read regions of the disk drive;
    consult the access log to determine whether the additional region of the disk drive has been recently read; and
    prefetch the additional region of the disk drive to a memory based at least in part upon the access log.

18. The article of claim 17, further storing instructions that causes a processor-based system to:
- scan an entry of the access log comprising a plurality of entries;
- find a previously read region entry in the access log; and
- determine whether the additional region and the previously read region are identical.

19. An article comprising a medium storing instructions that causes a processor-based system to:
- receive a request to write to a region of a disk drive;
- retrieve an access log of previously written regions of the disk drive;
- consult the access log to determine whether the previously written regions of the disk drive has been recently written; and
- write to a memory based upon the access log.

20. The article of claim 19, further storing instructions that causes a processor-based system to:
- scan an entry of the access log comprising a plurality of entries;
- find a previously written region entry in the access log; and
- compare a requested region to the previously written region entry.

21. The article of claim 20, further storing instructions that causes a processor-based system to determine whether the requested region is contiguous to the previously written region on the disk drive.

22. The article of claim 20, further storing instructions that causes a processor-based system to determine whether the requested region and the previously written region are identical.

23. An article comprising a medium storing instructions that causes a processor-based system to:
- receive a first request to access a region of a disk drive;
- store a record of the first request in a memory including information indicating whether the first request was a read or a write operation;
- service the first request;
- receive a second request to access a region of the disk drive;
- replace the record of the first request with a second record of the second request; and
- service the second request.

24. The article of claim 23, further storing instructions that causes a processor-based system to:
- receive a second request to access a region of the disk drive;
- store a second record of the second request to the record of the first request; and
- service the second request.

* * * * *